US011082476B2

(12) United States Patent
Shah et al.

(10) Patent No.: US 11,082,476 B2
(45) Date of Patent: Aug. 3, 2021

(54) COMPUTERIZED SYSTEM AND METHOD FOR AUTOMATICALLY PROVIDING NETWORKED DEVICES NON-NATIVE FUNCTIONALITY

(71) Applicant: VERIZON MEDIA INC., New York, NY (US)

(72) Inventors: Nilesh Shah, Monmouth Junction, NJ (US); Neil Anderson, New York, NY (US); Vinay Pulim, Brooklyn, NY (US)

(73) Assignee: VERIZON MEDIA INC., New York, NY (US)

( * ) Notice: Subject to any disclaimer, the term of this patent is extended or adjusted under 35 U.S.C. 154(b) by 778 days.

(21) Appl. No.: 15/351,482

(22) Filed: Nov. 15, 2016

(65) Prior Publication Data

US 2018/0139265 A1 May 17, 2018

(51) Int. Cl.
| G06F 15/16 | (2006.01) |
| H04L 29/08 | (2006.01) |
| H04W 4/80 | (2018.01) |
| H04W 4/029 | (2018.01) |
| H04W 4/06 | (2009.01) |
| H04W 84/12 | (2009.01) |
| H04W 88/02 | (2009.01) |

(52) U.S. Cl.
CPC .............. *H04L 67/04* (2013.01); *H04L 67/10* (2013.01); *H04L 67/16* (2013.01); *H04L 67/303* (2013.01); *H04W 4/029* (2018.02); *H04W 4/06* (2013.01); *H04W 4/80* (2018.02); *H04W 84/12* (2013.01); *H04W 88/02* (2013.01)

(58) Field of Classification Search
CPC ....................................................... H04L 67/04
See application file for complete search history.

(56) References Cited

U.S. PATENT DOCUMENTS

| 2010/0153577 | A1* | 6/2010 | Wohlert | H04N 7/17318 |
| | | | | 709/231 |
| 2011/0264730 | A1* | 10/2011 | Dattagupta | H04W 12/06 |
| | | | | 709/203 |
| 2012/0222074 | A1* | 8/2012 | Mix | H04N 21/25825 |
| | | | | 725/54 |

(Continued)

*Primary Examiner* — Kevin T Bates
*Assistant Examiner* — Clarence D McCray
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. Computer-based systems leverage information shared within an electronic computing environment in order to provide a novel framework for detecting device capabilities from broadcasted information shared by such devices, which creates more computing opportunities for direct integration of the physical world into computer-based systems, thereby improving efficiency, accuracy and cost-effectiveness in the manner media content, application program and/or computing services are provided.

16 Claims, 6 Drawing Sheets

(56) References Cited

U.S. PATENT DOCUMENTS

| | | | |
|---|---|---|---|
| 2013/0254395 A1* | 9/2013 | Chen | H04W 48/02 |
| | | | 709/225 |
| 2015/0186533 A1* | 7/2015 | Patil | G06Q 30/0631 |
| | | | 707/723 |
| 2017/0048788 A1* | 2/2017 | Chen | H04W 48/16 |
| 2017/0142763 A1* | 5/2017 | Bao | H04W 8/005 |

* cited by examiner

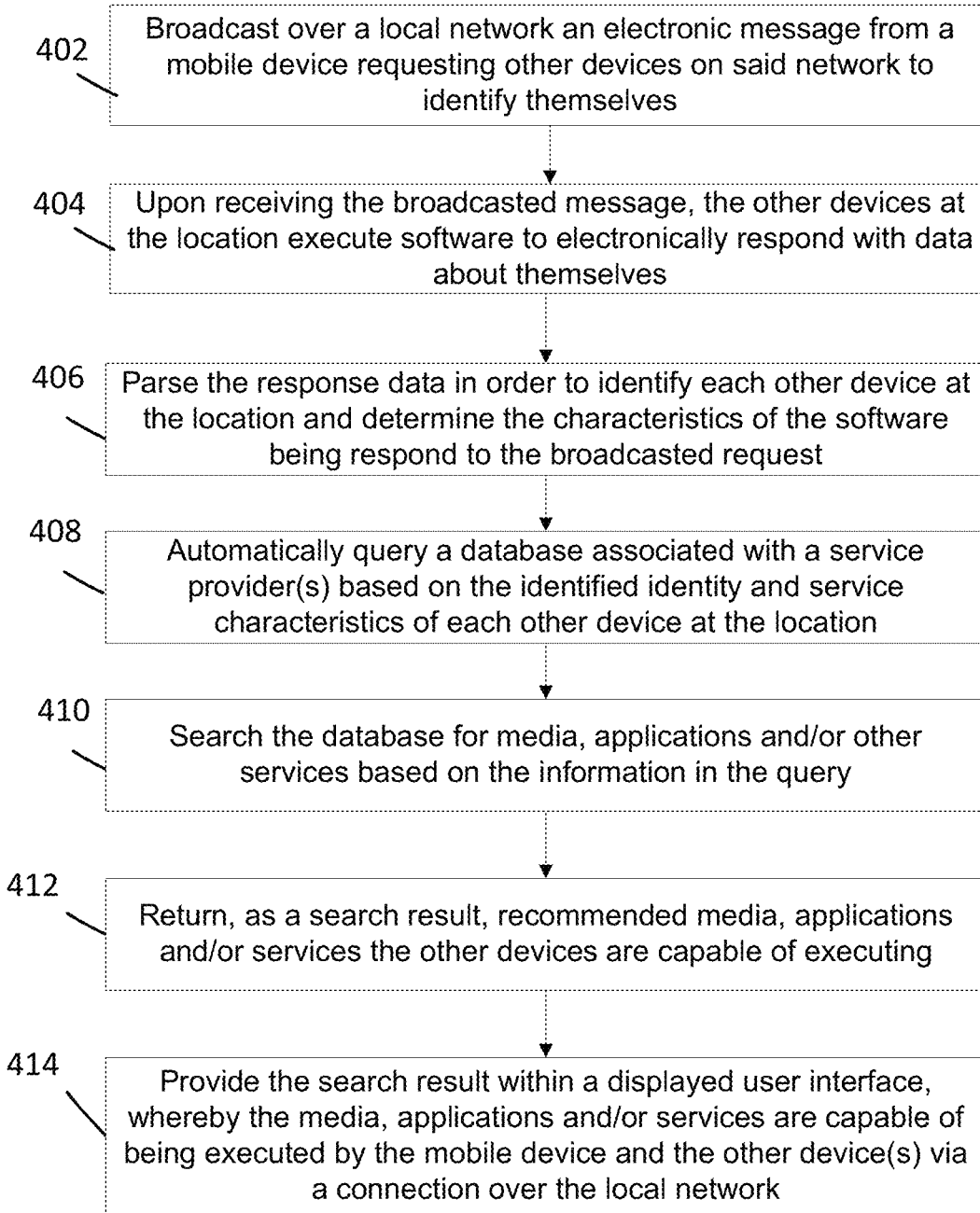
FIG. 4    400

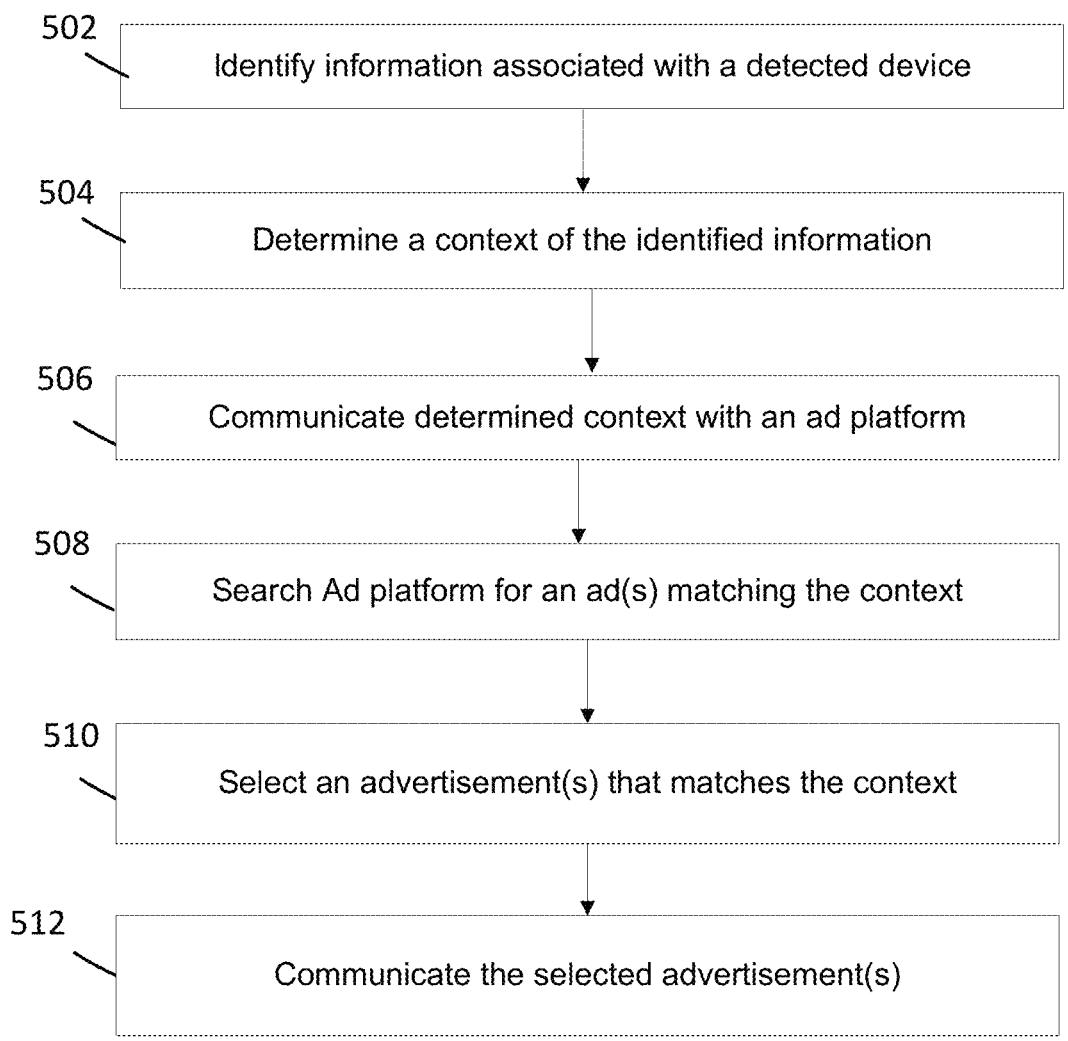

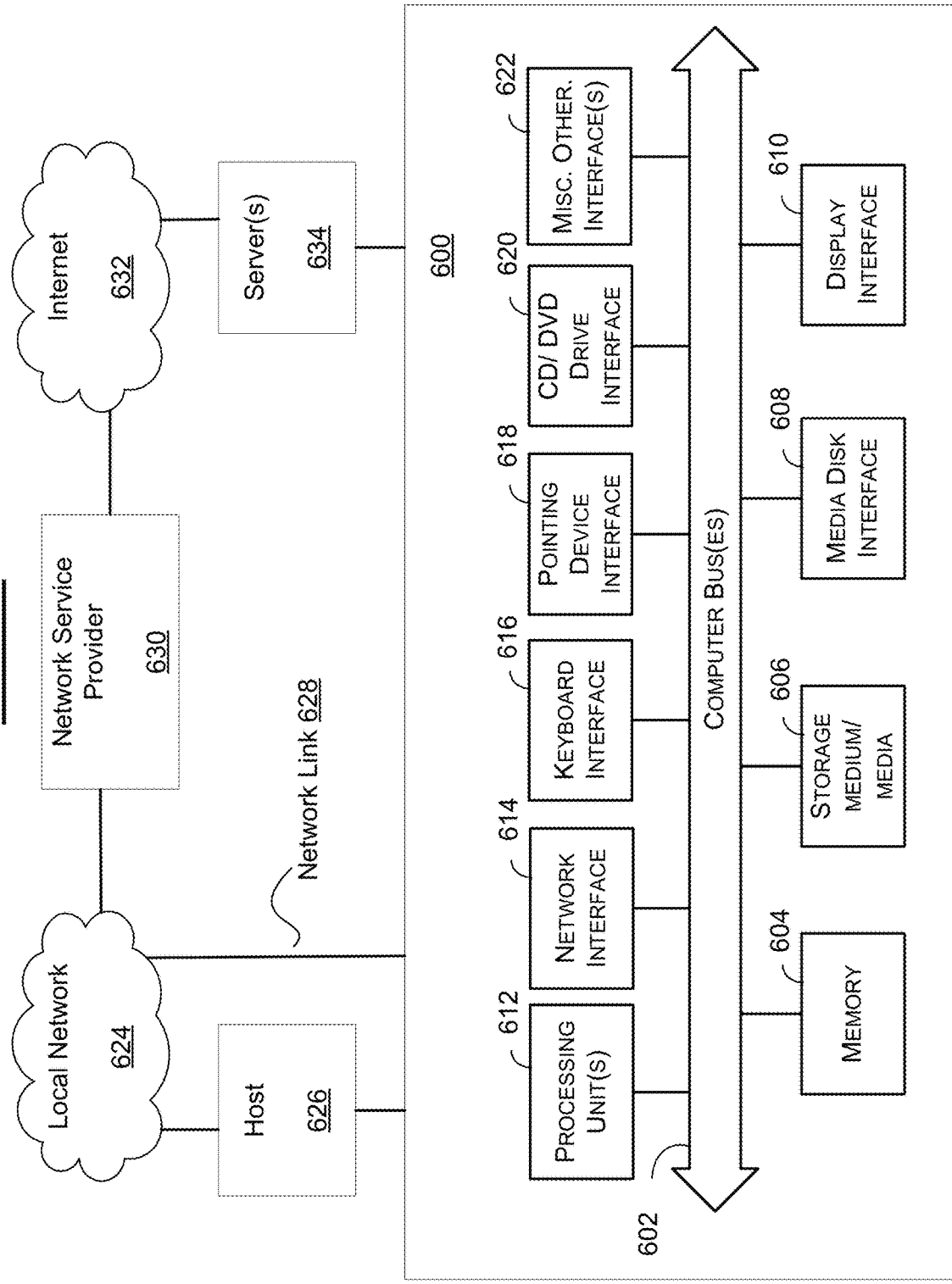

US 11,082,476 B2

COMPUTERIZED SYSTEM AND METHOD FOR AUTOMATICALLY PROVIDING NETWORKED DEVICES NON-NATIVE FUNCTIONALITY

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing and/or hosting computer devices, systems and/or platforms by modifying the capabilities and providing non-native functionality to such devices, systems and/or platforms for a novel and improved framework for automatically determining network device capabilities and functionality based on broadcasted information by network devices.

SUMMARY

According to some embodiments, the disclosed systems and methods provide a computerized framework for detecting device capabilities from broadcasted information occurring between devices at a location. In some embodiments, the broadcasted information can be a result of communicated data associated with Bluetooth®, Bluetooth Low Energy (BLE), Wi-Fi®, infrared, near-field and the like, or any other type of known or to be known communicated data occurring by and/or between devices, for example, within an Internet of Things (IoT) computing environment. In some embodiments, as discussed herein, capabilities of devices at or around a location can be determined, derived or otherwise identified from broadcasted information by these devices, which can be leveraged in order to identify media content, application programs and/or computing services that are capable of being rendered, processed, executed and/or installed on such devices. The rendering, execution and/or installation of such media content, application programs and/or computing services, which were not previously rendered, installed or associated with such devices, can result in the devices being provided improved efficiency, accuracy, functionality and cost-effectiveness in the manner in which the devices render content, access networks, or otherwise communicate data with other devices. In some embodiments, as evidenced from the discussion herein, provided content, programs and/or services can be automatically selected and/or modified to meet the capabilities, functionality and/or needs of such devices.

Accordingly, in one or more embodiments, a method is disclosed for a novel and improved framework for automatically determining network device capabilities and functionality based on information broadcasted by and between network devices. In some embodiments, such gathered data can then be utilized in providing media, services and/or other commercial or industrial opportunities that would not have been available to such devices without understanding the devices' capabilities. Therefore, according to some embodiments, the methods (and systems) provided herein provide the novel ability for detecting the capabilities of a discovered device to support specific technologies or products, and then for communicating information to the device, or user associated with such device, thereby enabling the execution (e.g., rendering, instantiating and/or installation) of said specific technology or product, which can provide the device with non-native or new features or capabilities not present prior to installation. Current systems only enable devices to execute (e.g., initiate or run) novel functionality at the request of a user; however, through implementation of the disclosed systems and methods, devices can be automatically provided with access to novel functionality and features based on the information devices communicate when interacting with or over a network.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for a novel and improved framework for automatically determining network device capabilities and functionality based on broadcasted information by network devices.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a flowchart illustrating steps performed in accordance with some embodiments of the present disclosure;

FIG. 5 is a flowchart illustrating steps performed in accordance with some embodiments of the present disclosure; and FIG. 6 is a block diagram illustrating the architecture of an exemplary hardware device in accordance with one or more embodiments of the present disclosure.

DESCRIPTION OF EMBODIMENTS

Figure 1:
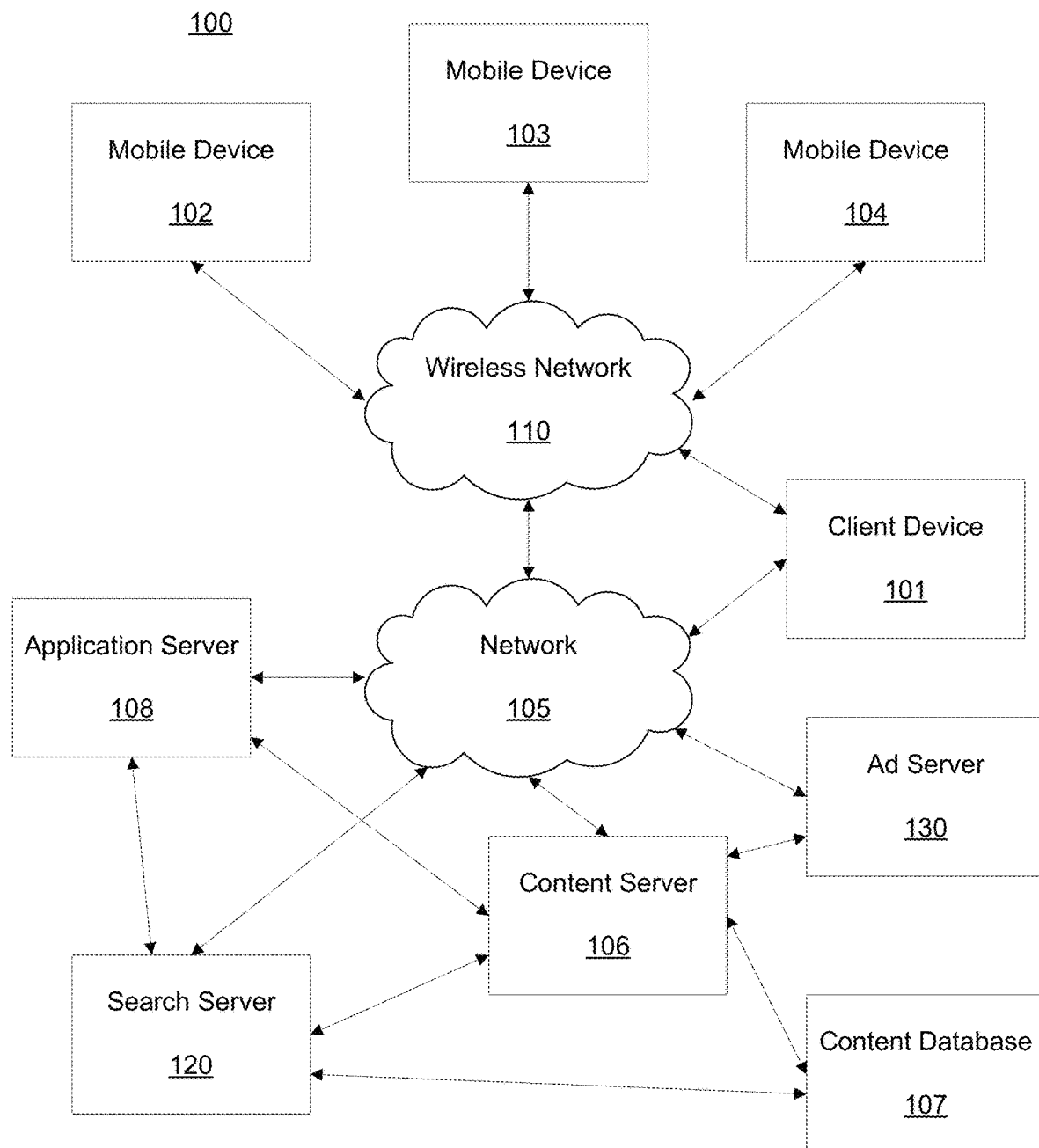
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The disclosed systems and methods automatically determine network device capabilities and functionality based on broadcasted information occurring by and/or between network devices. The disclosed systems and methods provide a novel framework for computer-based systems to leverage information shared between devices, for example according to some embodiments, within an Internet of Things (IoT) computing environment, in order to detect device capabilities from information shared by these devices, which creates more computing opportunities for direct integration of the physical world into computer-based systems, thereby improving efficiency, accuracy and cost-effectiveness in the manner media content, application program and/or computing services are provided.

By way of background, IoT, as understood by those of skill in the art, is the internetworking of physical devices and any type of known or to be known type of machines, buildings or other items embedded with electronics, software, sensors, actuators, and network connectivity that enable these items to collect and exchange data (also referred to as "connected devices" and "smart devices"). For example, such devices, machines or items can include, but are not limited to, mobile devices, computing devices or servers (as discussed below with reference to FIGS. 1-2), heart monitoring implants, biochip transponders on animals, automobiles with built-in sensors, DNA analysis devices for environmental/food/pathogen monitoring or field operation devices that assist firefighters in search and rescue operations. Indeed, such items (or objects or things) can include physical structures, devices or locations including a mixture of hardware, software, data and a service.

Regardless of their structure, such items collect useful data with the help of various existing technologies and then autonomously flow the data between other devices. For example, current market examples include home automation (also known as smart home devices) such as the control and automation of lighting, heating (e.g., smart thermostat), ventilation, air conditioning (HVAC) systems, and appliances such as washer/dryers, ovens or refrigerators/freezers that use Wi-Fi for remote monitoring.

The IoT allows objects to be sensed and/or controlled remotely across existing network infrastructure, creating opportunities for more direct integration of the physical world into computer-based systems. In some embodiments, when IoT is augmented with sensors and actuators, the technology becomes an instance of a class of cyber-physical systems, which also encompasses technologies such as smart grids, smart homes, intelligent transportation and smart cities, for example. Each item (or object or thing with the IoT environment) is uniquely identifiable through its embedded computing system but is able to interoperate within the existing Internet infrastructure.

Additionally, the expansion of Internet-connected automation can also include the collection and/or generation of data from diverse locations, which needed additional functionality is a by-product of the real-world and real-time necessity for quick aggregation of the data, and an increased need to index, store, and process such data more effectively. For example, IoT is can be a platform for a "Smart City," "Smart Home" and/or "Smart Energy Management Systems."

According to some embodiments, the disclosed systems and methods can execute a computerized framework that implements an IoT environment on devices at a networked location, thereby collecting and processing data broadcast by each device at such location. As understood by those of skill in the art, a location can include a person's home, their office, their car, a city, or any known location that can be viewed as a network where separate devices are understood as "connected devices." The data broadcast between devices at a location can include information related to, but not limited to, the device information (e.g., identifier, version, type, owner, and the like), software installed, a number of mobile/desktop devices they already have common products on (e.g., which other devices have the same program installed—for example, a user has Yahoo! Mail® installed on his phone and on the user's iPad®, where the user can access her mail account from either device), and the like.

As evident from the discussion herein, understanding which capabilities and functionality each device can implement can lead to a content provider or third-party provider to deliver an improved user experience, cross-sell products, or even provide more accurate, interest-based advertisements to users.

By way of a non-limiting example, Smart TVs are entering more and more homes every day. Through implementation of the disclosed systems and methods, as discussed in more detail below, non-native, installable or third-party technology that these TVs can support can be derived from the data the Smart TVs are broadcasting within a user's home. Such information can be provided to a service provider—e.g., Yahoo!®—which can leverage this information to adapt content, programs and/or advertising according to the TVs capabilities and functionality. By way of another non-limiting example, implementation of the disclosed systems and methods can detect the capabilities of printers on a local network. As a result of such detection, relevant advertisements regarding where to find ink or toner for those specific printers can be provided to the user (e.g., via messages sent to the user's devices connected to the printer or to the user's messaging account).

Existing "device discovery" technologies, such as Bluetooth® or Bonjour® for example, only enable devices to perform already installed or existing functions or services. The disclosed systems and methods expand upon this by providing added functionality and capabilities to such systems by, for example, detecting the services already executing by a device, then providing additional services to the device that the device is determined to be capable of executing, whereby the determination of whether the device can execute the new services is performed in accordance with the information associated with the existing services. Therefore, these devices can be provided new or additional media, services and/or other commercial or industrial opportunities that would not have been available to such devices without understanding the devices' capabilities. Thus, the disclosed systems and methods create a new computerized framework and/or mechanism for leveraging collected data in order to provide new types of data not present within the collected data. As discussed in more detail below, the disclosed systems and methods are able to determine not only the identity of a device (e.g., device identifier (ID)) at a location, but also the types of such devices and the capabilities such devices have and/or are currently performing.

Therefore, according to some embodiments, the disclosed systems and methods provide the novel ability for detecting the capability of a discovered device to support specific technologies or products, and then for communicating information to the device for viewing or experiencing by, or interaction with, the user associated with such device, thereby enabling the installation of said specific technology or product, which can provide the device with non-native or new features or capabilities not present prior to installation.

As discussed in more detail below at least in relation to FIG. 6, according to some embodiments, information associated with or derived from detected devices and/or detected device capabilities, as well as information being rendered or executed by such devices including, but not limited to, applications, services, programs, scripts, videos, images, audio and/or any other type of products and/or media and multi-media information, can be used for monetization purposes and targeted advertising when providing, delivering or enabling such devices access to media and/or applications provided over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, service or an associated application, such as a photo sharing site/service (e.g., Tumblr®), an email platform or social networking site, a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), a mail or messaging application (e.g., Yahoo!® Mail, Yahoo!® Messenger), and the like, can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
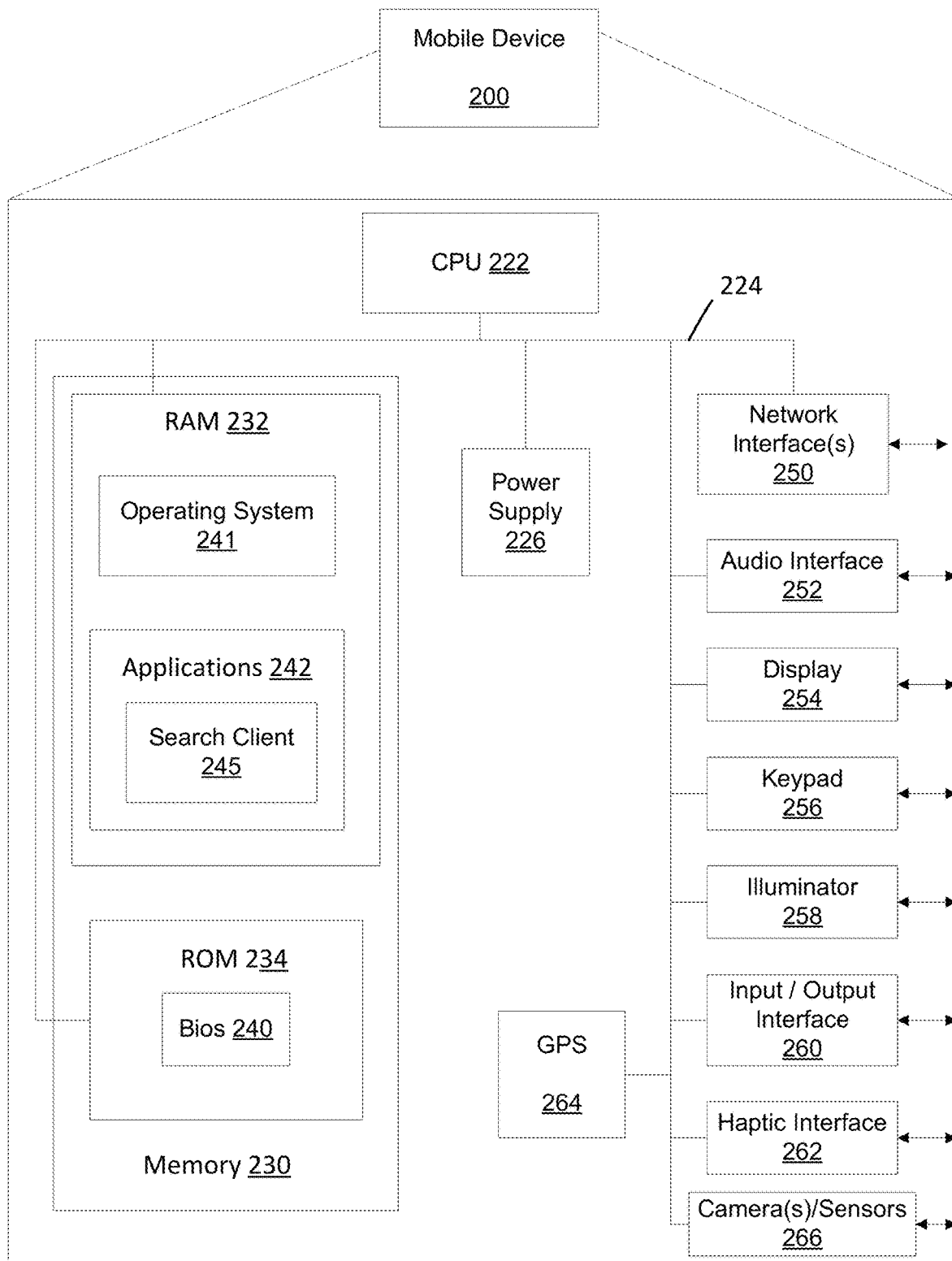
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving digital content (e.g., advertisements) or other forms of digital data associated with, but not limited to, IMs, emails, and other types of known messages, or the like.

Having described the components of the general architecture employed within the disclosed systems and methods, the components' general operation with respect to the disclosed systems and methods will now be described below.

Figure 3:
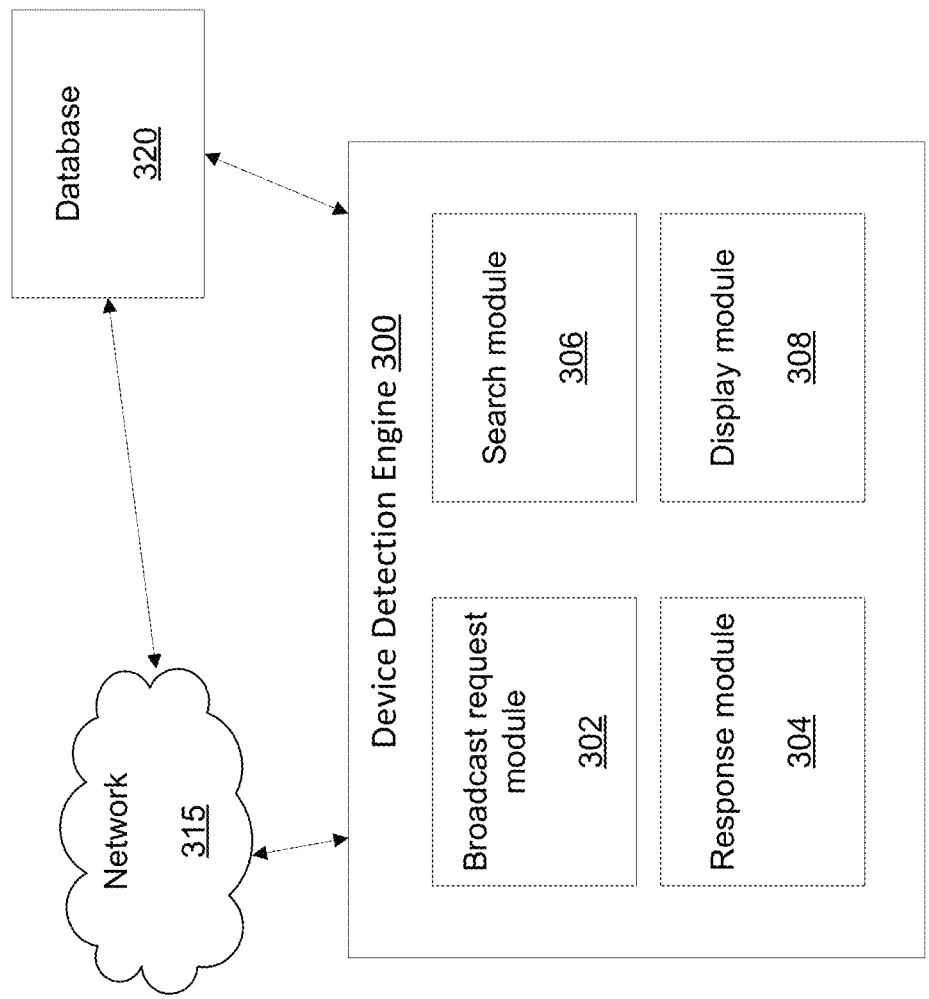
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a device detection engine 300, network 315 and database 320. The device detection engine 300 can be a special purpose machine or processor and could be hosted by an application server, content server, social networking server, web server, search server, content provider, email service provider, ad server, user's computing device, and the like, or any combination thereof.

According to some embodiments, device detection engine 300 can be embodied as a stand-alone application that executes on a user device. In some embodiments, the device detection engine 300 can function as an application installed on the user's device, and in some embodiments, such application can be a web-based application accessed by the user device over a network. In some embodiments, the device detection engine 300 can be installed as an augmenting script, program or application to another media and/or content hosting/serving application, such as, for example, Yahoo!® Search, Yahoo!® Mail, Flickr®, Tumblr®, Twitter®, Instagram®, SnapChat®, Facebook®, Amazon®, YouTube® and the like.

The database 320 can be any type of database or memory, and can be associated with a content server on a network (e.g., content server 106, search server 120, ad server 130 or application server 108 from FIG. 1) or a user's device (e.g., device 101-104 or device 200 from FIGS. 1-2). Database 320 can comprise, for example, a dataset of content items (e.g., video files, multi-media files, images and the like), device data and associated metadata, and user data and associated user metadata. Such information can be stored in the database 320 independently and/or as a linked or associated dataset. It should be understood that the data (and metadata) in the database 320 can be any type of content, user, device or network information and type, whether known or to be known, without departing from the scope of the present disclosure.

Database 320 comprises a dataset of data and metadata associated with local and/or network information related to users, devices, services, applications, user-generated content, third party provided content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

According to some embodiments, the user data can also include, for purposes rendering and/or displaying content, and/or downloading, streaming and/or accessing applications on or over the network, device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, content generating and hosting sites or providers that enable users to search for, upload, download, share, edit or otherwise avail users to content (e.g., Yahoo!® Search, Yahoo!® Mobile applications, Yahoo!® Mail, Flickr®, Tumblr®, Twitter®, Instagram®, SnapChat®, Facebook®, Amazon®, YouTube®, and the like). In some embodiments, database 320 can comprise data and metadata associated with such content information from one and/or an assortment of media hosting sites. In some embodiments, such content provider information can include, but is not limited to, versions, types and/or capabilities of applications that are resident or accessed by a user device, and/or are capable of being downloaded, executed, accessed or run on user device for purposes of rendering content.

In some embodiments, the information stored in database 320 can be represented as an n-dimensional vector (or feature vector) for each stored data/metadata item, where the information associated with, for example, the stored data and/or metadata can correspond to a node(s) on the vector. As such, database 320 can store and index stored information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion of some embodiments involves vector analysis of stored information, as discussed above, the information can be analyzed, stored and indexed according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

In some embodiments, database 320 can be a single database housing information associated with one or more devices, users, services and/or content providers, and in some embodiments, database 320 can be configured as a linked set of data stores that provides such information, as each datastore in the set is associated with and/or unique to a specific user, device, service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the device detection engine 300, and the database of stored resources 320. Indeed, as illustrated in FIG. 3, the device detection engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as device detection engine 300, and includes broadcast request module 302, response module 304, search module 306 and display module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 4, Process 400 details steps performed in accordance with some embodiments of the present disclosure for automatically determining network device capabilities and functionality based on information broadcasted by and between devices on a network. While the discussion herein will reference information shared over a network by and between devices via Bluetooth® and/or Wi-Fi® technology, usage of such networking capabilities should not be construed as limiting, as any type of known or to be known communication technology, whether a local network, short-range network (e.g., NFC) or over the Internet, can be used without departing from the scope of the instant application. Indeed, the communication of the networked devices can occur at or within a location, and such location can be a room, house, building, vehicle, train, airplane, office, devices being worn and/or carried by a person, and the like. While the discussion herein will focus on devices at a single location (e.g., a user's home), it should not be construed as a limiting, as expansion of the location to outside such location, or even around the world (e.g., within a city, town, country, hemisphere, and the like) will be understood by those of skill in the art as not limiting the scope and applicability of the disclosed systems and methods.

As evidenced from the discussion below in relation to Process 400 of FIG. 4, computer-based systems can analyze information shared between devices within a computing environment (e.g., BLE® or Wi-Fi®) in order to detect device capabilities of the devices within the computing environment. This analyzed information can be leveraged in order to create more computing opportunities for direct integration of the physical world into computer-based systems, thereby improving efficiency, accuracy and cost-effectiveness in the manner media content, application program and/or computing services are provided to such devices.

As discussed in more detail below, Steps 402-404 of Process 400 is performed by the broadcast request module 302 of the device detection engine 300; Step 406 is performed by the response module 304; Steps 408-412 are performed by the search module 306; and Step 414 is performed by display module 308.

Process 400 begins with Step 402 where a user's device, for example a mobile device as illustrated in FIGS. 1-2, broadcasts an electronic message over a local network for other devices in or at a location to identify themselves (e.g., respond with identifying information) respond). This broadcasted message is communicated over the local network, which as discussed above, can be a BLE network or Wi-Fi network, for example; and, such message is broadcasted over the network to devices within range of such network, or at the location.

In Step 404, in response to the broadcasted message from the mobile device, the other devices at the location respond with data that provides information about each device, respectively. The data in each response message can include, but is not limited to, characteristics (or parameters) that provide information as to what kind of device the respective other device is (e.g., type, version, manufacturer, and the like), the protocol the other device can speak and/or understand, the capabilities the other device has, the software installed and/or executing on the device, and the like.

According to some embodiments, each of these other devices executes a software application that acts a facilitating framework for responding to the broadcast request from the mobile device. For example, one of the other devices at the location (e.g., connected to the Wi-Fi network) is a printer. The printer device executes print software that is capable of not only printing documents, but also connecting to the Wi-Fi network in order to receive wireless data for subsequent printing from the mobile device. As such, the printer device utilizes this print software to respond to the broadcast request from the mobile device. Therefore, the data in the response from the printer identifies that the device is a printer, what kind of printer, and provides information as to the type of software it is executing.

In Step 406, the mobile device receives the responses from each of the other devices at the location, and using the device detection engine 300, parses the data in each response message in order to identify the other devices, and their respective characteristics. In some embodiments, the responses are parsed and analyzed in real-time (e.g., as they are received). In some embodiments, the parsing and analysis by the engine 300 executing on the mobile device can occur periodically, at a user's request, or can occur upon a determination that no other devices are at the location (or are actually or capable of responding—which can be determined according to a threshold time period expiring after sending the request from Step 402).

According to some embodiments, the data in each response message is parsed and analyzed via any known or to be known algorithm, technique, mechanism or technology that performs computational analysis of received data in order to identify the information such data represents. For example, such computational analysis algorithms, techniques, mechanisms and/or technology can include, but are not limited to, classifiers and/or categorizers using logistic regression or learning models including, for example, support vector machines (SVMs) to map the information in the data into identifiable data objects.

Therefore, according to some embodiments, Step 406 involves the mobile device receiving the response messages from each of the other devices at the location (or those devices that received the broadcast request from the mobile device over the local network), parsing the response messages and determining, from the data in each message, information that includes, but is not limited to, the identity of each device (and an identified (ID) of each device), the protocol of each device, the identity of software/applications/programs executing and/or capable of executing on the device, and the like, as discussed above.

Using the example above related to the mobile device receiving a response from the printer device, the mobile device can, via Step 406, understand that the device is a printer, know the identifier of the printer, understand its print capabilities, and know which software versions of the print engine/software is installed on the printer.

According to some embodiments, the engine 300 (and sub-modules 302-308) mentioned with regard to the performance of the steps of Process 400 discussed herein are referenced according to embodiments of the steps occurring on a mobile device of a user; however, it should be understood that embodiments exist where the engine can execute on any device at the location and/or on any device that is in contact with the location without departing from the scope of the instant disclosure.

In Step 408, the mobile device compiles the response data from the other devices at the location (that was parsed and analyzed in Step 406), and generates a query that is to be sent to a database associated with a service provider(s)—for example, Yahoo!®. In some embodiments, the query includes information related to the identity of the other devices at the location that the mobile device is able to connect with via the local network, the identity of the services and/or capabilities each device is capable of rendering, and the like, as discussed above.

This query is then sent over a network (e.g. the Internet) to a server of the service provider(s) and is utilized as search parameters of the associated database. Using the query's included information as detailed above in reference to Steps 406-408, a search of the database is performed in order to identify other media content, applications and/or other services that are capable of being rendered and/or executed by the other devices on the network. In Step 412, the identified media content, applications and/or other services are returned as a search result to the mobile device. In Step 414, the search result is analyzed resulting in the extraction of information associated with the identified media content, applications and/or other services, which results in the extracted information being displayed within a user interface rendered on a display of the mobile device. The media content, applications and/or other services identified in the search are those content items or objects, or software programs that each other device is determined to be capable of rendering, executing, instantiating and/or or installing, respectively, based on their associated capabilities (e.g., characteristics), which were included in the query compiled in Step 408.

According to some embodiments, the search of the database for other media content, applications and/or services capable of being rendered by the other devices involves searching, using the query, for information that is not present but capable of being performed by the other devices. For example, if a device (e.g., smart watch) has installed a pedometer application but not a fitness tracking application, the search result can include a link enabling the installation of version of the fitness tracking application that is executable on the device. Therefore, the search for additional capability occurring in Step 410 involves leveraging the known capabilities and installed services of the other devices in order to identify new (or additional) services that are not currently installed but are capable of being rendered by the other device.

According to some embodiments, the search of the database involves identifying information about a user and/or the user's device based on the user's account information and/or device information, which can be determined from the device ID (identified from Step 406). As discussed above with reference to database 320 in FIG. 3, a user profile can store information about a user's account and/or the device he/she is using when accessing or using applications associated with the account (or service). Therefore, for example, the search in Step 410 can involve searching the database for device information based on the device ID, then determining that the device does not have a type of application installed, and as discussed in relation to Step 412, providing that type of application as a search result. In another non-limiting example, the device ID can be utilized to identify, from within the information stored in a database (e.g., database 320), that a user having a specific user profile providing application information (or any other type of information about the user and/or his networked activity, and the like) is associated with that ID, then using this as a sub-search to identify the applications or other types of content or services that the user would be interested in rendering via the device associated with the device ID.

By way of a non-limiting example, put forth solely for purposes of illustrating an operating environment example of Process 400, user Bob, carrying his mobile phone enters his room at his house. As soon as Bob enters his room, his mobile phone automatically connects to his local Wi-Fi network. Upon this automatic detection and connection, a request is broadcast from the mobile device over Bob's local network for other devices in his room to identify themselves. In Bob's room is a printer, a smart Television (TV) and a smart thermostat (e.g., NEST®). These devices are also connected to the Wi-Fi network, and upon receiving the mobile device's request, they automatically respond with data that identifies their identifier (ID), type, software each device is running and any other characteristic that identifies each device's capabilities, respectively. In response to receiving the response messages from the printer, TV and thermostat, Bob's mobile device formulates and sends a search request to a database for additional content and/or services capable of being rendered on those devices based on the response message data. This search is performed, returned, and then displayed on Bob's mobile device so that Bob is able to perform those capabilities—render the content and/or execute those programs identified in the search result respective the appropriate device in his room.

For example, Bob's smart TV, from its response message to the mobile device's broadcast request, is understood to be able to render media from Netflix® due to an installed Netflix application on the TV (as identified from the characteristics in the response message). However, upon searching the database of the service provider and knowing that Bob is a football fan, Yahoo!® will be exclusively streaming this Sunday's football game and Bob's TV does not have Yahoo!'s streaming application installed on his TV. Therefore, the search result can include an executable hyperlink and/or message enabling Bob's mobile device to trigger the installation of the Yahoo! streaming application on his TV.

In another non-limiting example, Bob's thermostat is capable of being controlled from his mobile device. However, through performance of Process 400 by engine 300 executing on Bob's mobile device, program extensions and/or plug-ins for additional controls of the thermostat can be provided to Bob (which can be from the thermostat's provider or a partner provider). These extensions can provide the thermostat with additional functionality that was not present before the steps of Process 400, and they were automatically determined according to a process that was triggered from a mobile device connecting to a local network. For example, the thermostat can be provided non-native functionality by identifying and automatically installing third party applications that provide additional controls or capabilities to the thermostat not present when the thermostat is manufactured (e.g. the ability to track temperature statistics or communicate with other thermostats).

In yet another non-limiting example, as discussed in more detail below with reference to FIG. 5, through performance of Process 400 by engine 300 executing on Bob's mobile device, the type of ink the printer uses and/or is capable of rendering when printing media content can be identified and leveraged in order to identify an advertisement for printer ink, which can be provided to Bob as a search result (e.g., the ad can include information about the specific ink for the type of printer in Bob's room).

FIG. 5 is a work flow example 500 for serving relevant digital media content associated with advertisements (e.g., digital advertisement content) based on the information associated with a detected device and/or the detected device's capabilities, as discussed above in relation to FIGS. 3-4. Such information, referred to as "device information" for reference purposes only, can include, but is not limited to, information associated with or derived from detected devices and/or detected device capabilities, as well as information being rendered, processed or executed by such devices including, but not limited to, applications, services, programs, scripts, videos, images, audio and/or any other type of products and/or media and multi-media information, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 502, device information is identified. As discussed above, the device information can be based any of the information from processes outlined above with respect to FIGS. 3-4. For purposes of this disclosure, Process 500 will refer to single detected device and its capabilities as the basis for serving a digital advertisement(s); however, it should not be construed as limiting, as any number of devices and capabilities, as well as programs and/or content items provided to/from such device(s) based on its identity and/or capabilities can form such basis, without departing from the scope of the instant disclosure.

In Step 504, a context is determined based on the identified device information. This context forms a basis for serving advertisements related to the device information. In some embodiments, the context can be determined by determining a type of device and/or capabilities of the device. In some embodiments, the context can be based on a determined category which the device information of Step 502 represents. For example, the category can be related to a content type of the media or application being provided to a device based on its identity/capabilities. In some embodiments, the identification of the context from Step 504 can occur before, during and/or after the analysis detailed above with respect to Process 400, or some combination thereof.

In Step 506, the determined context is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 508, the advertisement server 130 searches the ad database for a digital advertisement(s) that matches the identified context. In Step 510, an advertisement is selected (or retrieved) based on the results of Step 508. In some embodiments, the selected advertisement can be modified to conform to attributes or capabilities of the page, message or method upon which the advertisement will be displayed, and/or to the application and/or device for which it will be displayed. In some embodiments, the selected advertisement is shared or communicated via the application the user is utilizing to view, search for and/or render media on the device. Step 512. In some embodiments, the selected advertisement is sent directly to each user's computing device (and/or the identified other devices at the location). In some embodiments, the selected advertisement is displayed in conjunction with the capabilities of the detected device—for example, within the application that was provided as additional capabilities (or functionality—e.g., recommended services) based on the detected capabilities, as discussed above.

As shown in FIG. 6, internal architecture 600 of a computing device(s), computing system, computing platform and the like includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk interface 608 and/or media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces 622 not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing image and/or video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    broadcasting, over a network via a computing device, a request for a second device connected to said network to identify itself to said computing device;
    receiving, in response to said broadcasted request at said computing device, a response message from said second device, said response message comprising information identifying said second device and capabilities of said second device, said response message information comprising data associated with a type of said second device and protocol executed by said second device;
    parsing, by the computing device, said response message from said second device; and
    analyzing, by the computing device, said information within said parsed response message, and based on said analysis, identifying said data;
    generating, via the computing device, a search request based on the information comprised within said response message, the search request comprising information at least corresponding to the identified data;
    communicating, via the computing device, said search request to a database to cause a search to be performed based on said search request information;
    receiving, at the computing device, a search result in response to said search request;
    analyzing, via the computing device, said search result and extracting information associated with additional capabilities specific to the second device, said additional capabilities being associated with processing capabilities of the second device not included in the capabilities identified in the response message, the processing capabilities corresponding to the type of the second device and the protocol executed by the second device; and
    displaying, on a display of the computing device, a user interface displaying the search result, said displayed search result comprising the functionality enabling the computing device to cause the second device to execute the additional capabilities.

2. The method of claim 1, wherein said response message information further comprises data selected from a group consisting of: an identifier (ID) of the second device, applications installed on the second device, applications capable of being installed on said second device, and an application being used to respond to the broadcasted request over the network.

3. The method of claim 1, wherein said additional capabilities are associated with an application program executable and installable on the second device, wherein said display of said search result enables said computing device to interact with said search result and cause the second device to execute said application program.

4. The method of claim 1, wherein said additional capabilities are associated with a computer service of a service provider that is executable by said second device, wherein said display of said search result enables said computing device to interact with said search result and cause the second device to execute said computer service.

5. The method of claim 1, wherein said additional capabilities are associated with media content determined to be renderable by said second device.

6. The method of claim 1, further comprising:
    determining a context of the additional capabilities, said additional capabilities are associated with at least one of media content, application programs and computer services;
    causing communication, over the network, of said context to an advertisement platform to obtain a digital content item comprising digital advertisement content associated with said context;
    receiving, over the network, said digital content item; and
    displaying said digital content item on said display of the computing device.

7. The method of claim 1, wherein said computing device is a mobile device.

8. The method of claim 1, wherein said second device is a peripheral device capable of being paired with said computing device over said network.

9. The method of claim 1, wherein said network is a local network associated with a location, wherein said computing device and said second device are at said location.

10. The method of claim 1, wherein said broadcasted request from said computing device is a request for a plurality of devices, and said additional capabilities are associated with capabilities of each of said plurality of devices.

11. A non-transitory computer-readable storage medium tangibly encoded with computer-executable instructions, that when executed by a processor associated with a computing device, performs a method comprising:
    broadcasting, over a network, a request for a second device connected to said network to identify itself to said computing device;
    receiving, in response to said broadcasted request, a response message from said second device, said response message comprising information identifying said second device and capabilities of said second device, said response message information comprising data associated with a type of said second device and protocol executed by said second device;

parsing said response message from said second device; and analyzing said information within said parsed response message, and based on said analysis, identifying said data;

generating a search request based on the information comprised within said response message, the search request comprising information at least corresponding to the identified data;

communicating said search request to a database to cause a search to be performed based on said search request information;

receiving a search result in response to said search request;

analyzing said search result and extracting information associated with additional capabilities specific to the second device, said additional capabilities being associated with processing capabilities of the second device not included in the capabilities identified in the response message, the processing capabilities corresponding to the type of the second device and the protocol executed by the second device; and displaying, on a display of the computing device, a user interface displaying the search result, said displayed search result comprising the functionality enabling the computing device to cause the second device to execute the additional capabilities.

12. The non-transitory computer-readable storage medium of claim 11, wherein said additional capabilities are associated with an application program executable and installable on the second device, wherein said display of said search result enables said computing device to interact with said search result and cause the second device to execute said application program.

13. The non-transitory computer-readable storage medium of claim 11, wherein said additional capabilities are associated with a computer service of a service provider that is executable by said second device, wherein said display of said search result enables said computing device to interact with said search result and cause the second device to execute said computer service.

14. The non-transitory computer-readable storage medium of claim 11, wherein said additional capabilities are associated with media content determined to be renderable by said second device.

15. The non-transitory computer-readable storage medium of claim 11, further comprising:

determining a context of the additional capabilities, said additional capabilities are associated with at least one of media content, application programs and computer services;

causing communication, over the network, of said context to an advertisement platform to obtain a digital content item comprising digital advertisement content associated with said context;

receiving, over the network, said digital content item; and displaying said digital content item on said display of the computing device.

16. A system comprising:

a processor; and a non-transitory computer-readable storage medium for tangibly storing thereon program logic for execution by the processor, the program logic comprising:

logic executed by the processor for broadcasting, over a network, a request for a second device connected to said network to identify itself to said computing device;

logic executed by the processor for receiving, in response to said broadcasted request, a response message from said second device, said response message comprising information identifying said second device and capabilities of said second device, said response message information comprising data associated with a type of said second device and protocol executed by said second device;

logic executed by the processor for parsing said response message from said second device; and logic executed by the processor for analyzing said information within said parsed response message, and based on said analysis, identifying said data;

logic executed by the processor for generating a search request based on the information comprised within said response message, the search request comprising information at least corresponding to the identified data;

logic executed by the processor for communicating said search request to a database to cause a search to be performed based on said search request information;

logic executed by the processor for receiving a search result in response to said search request;

logic executed by the processor for analyzing said search result and extracting information associated with additional capabilities specific to the second device, said additional capabilities being associated with processing capabilities of the second device not included in the capabilities identified in the response message, the processing capabilities corresponding to the type of the second device and the protocol executed by the second device; and logic executed by the processor for displaying, on a display of the computing device, a user interface displaying the search result, said displayed search result comprising the functionality enabling the computing device to cause the second device to execute the additional capabilities.

* * * * *